United States Patent [19]

Scusa

[11] 3,948,465
[45] Apr. 6, 1976

[54] FISHING REEL CONSTRUCTION

[76] Inventor: Paul A. Scusa, W. River Road, West Phoenix, N.Y. 13135

[22] Filed: May 30, 1974

[21] Appl. No.: 474,363

[52] U.S. Cl........ 242/219; 242/84.21 R; 242/84.5 R
[51] Int. Cl.² ........................................ A01K 89/00
[58] Field of Search... 242/84.21 R, 84.2 R, 84.2 G, 242/84.2 H, 84.21 A, 217, 218, 219, 84.5 R

[56] References Cited
UNITED STATES PATENTS

| | | | |
|---|---|---|---|
| 3,119,573 | 1/1964 | Brulhart | 242/84.21 R |
| 3,223,348 | 12/1965 | Clark | 242/84.21 A |
| 3,814,349 | 6/1974 | Menne | 242/84.2 A |

*Primary Examiner*—Stanley N. Gilreath
*Assistant Examiner*—Jillions: John M.
*Attorney, Agent, or Firm*—Bruns & Jenney

[57] ABSTRACT

An improved line drag inducing means is adaptable for use in spinning and spin cast type fishing reels. A line handling member is operably connected to driving means by clutch means. An adjustable first spring means biases the clutch means into engagement, whereby a non-rotatable spool has a line wound thereon by the line handling member. A sufficiently strong pull on the line will cause the line handling member to overcome the resistance to reverse rotation, relative to the driving means, resulting from the engagement of the clutch. Reverse rotation of the line handling member will unwind the line from the spool. Second spring means opposing disengagement of the clutch means are compressible by a sufficiently strong forward pull on the line handling member.

2 Claims, 5 Drawing Figures

FISHING REEL CONSTRUCTION

BACKGROUND OF THE INVENTION

This invention relates to fishing reels having means to induce line drag and in particular to fishing reels having clutch means operably connecting a line handling member to driving means, with the clutch means inducing the line drag.

Conventional fishing reels of both the spinning and spin cast type have drag inducing means which typically consist of friction discs alternately keyed to the spool and reel housing. This location of the drag inducing means has created two problems. First, as the line is unwound from the spool by a running fish the circumference of the windings on the spool decreases. Because it takes the same rotational force to overcome the frictional resistance to each revolution, and because as the winding's diameter decreases the length of line released for each revolution decreases, it will take more force per unit of line released to overcome the drag on the line the further the fish runs. A typical reel may have an increase in drag from a full spool to an almost empty spool of about 300 percent. This is particularly troublesome to those sport fishermen who, in catching large fish on low test lines, initially adjust the line drag to slightly less than the tensile strength of the line.

The second problem caused by existing drag inducing means is the twisted line or "bird's nest." In present fishing reels the line is twisted as it is rewound by the line handling member, but this is compensated for by untwisting as the line is cast. However, each time the line is unwound against the drag there is no untwisting, with the result that as a fish is played, i.e., alternately allowed to run and then reeled in, there is cummulative twisting with no compensating untwisting. The line eventually becomes so twisted that any momentary slack on the line will result in a coiling of the slack line into a jumble called a bird's nest.

SUMMARY OF THE INVENTION

The improved line drag inducing means of the invention is adaptable for use in spinning and spin cast type fishing reels. A line handling member is operably connected to driving means by clutch means. An adjustable first spring means biases the clutch means into engagement, whereby a non-rotatable spool has a line wound thereon by the line handling member.

When a hooked fish is running, the line is unwound from the non-rotatable spool under the control of the line handling member. If the running fish applies a sufficiently strong unwinding pull on the line, a rotational force in the reverse direction is applied to the line handling member. With the driving means held against reverse rotation, the rotational force will cause slippage in the engaged clutch means. Being unwound under the control of the line handling member, the line is twisted in the reverse direction to compensate for the twisting that takes place during winding. Also, by having the line drag induced through the line handling member, the strength of the drag is not dependent upon the length of line unwound during each unwinding revolution.

However, the amount of this drag is dependent upon the angle which the line makes with the spool. Although the increase in drag that stems from a decrease in winding diameter is much less than that of a conventional reel, means to compensate for even this smaller increase may be advantageously incorporated in the fishing reel of the invention. Thus, second spring means that oppose disengagement of the clutch means are compressible by a sufficiently strong forward pull on the line handling member. As the spring means are compressed by the increasingly strong pull on the line handling member that is needed to overcome the increasing resistance to unwinding, the line handling member is able to move axially, thereby relieving some of the engagement bias on the clutch means. As the engagement bias is reduced the resistance to relative rotation of the line handling member to the driving means is reduced.

DESCRIPTION OF THE PREFERRED EMBODIMENTS

Figure 1:
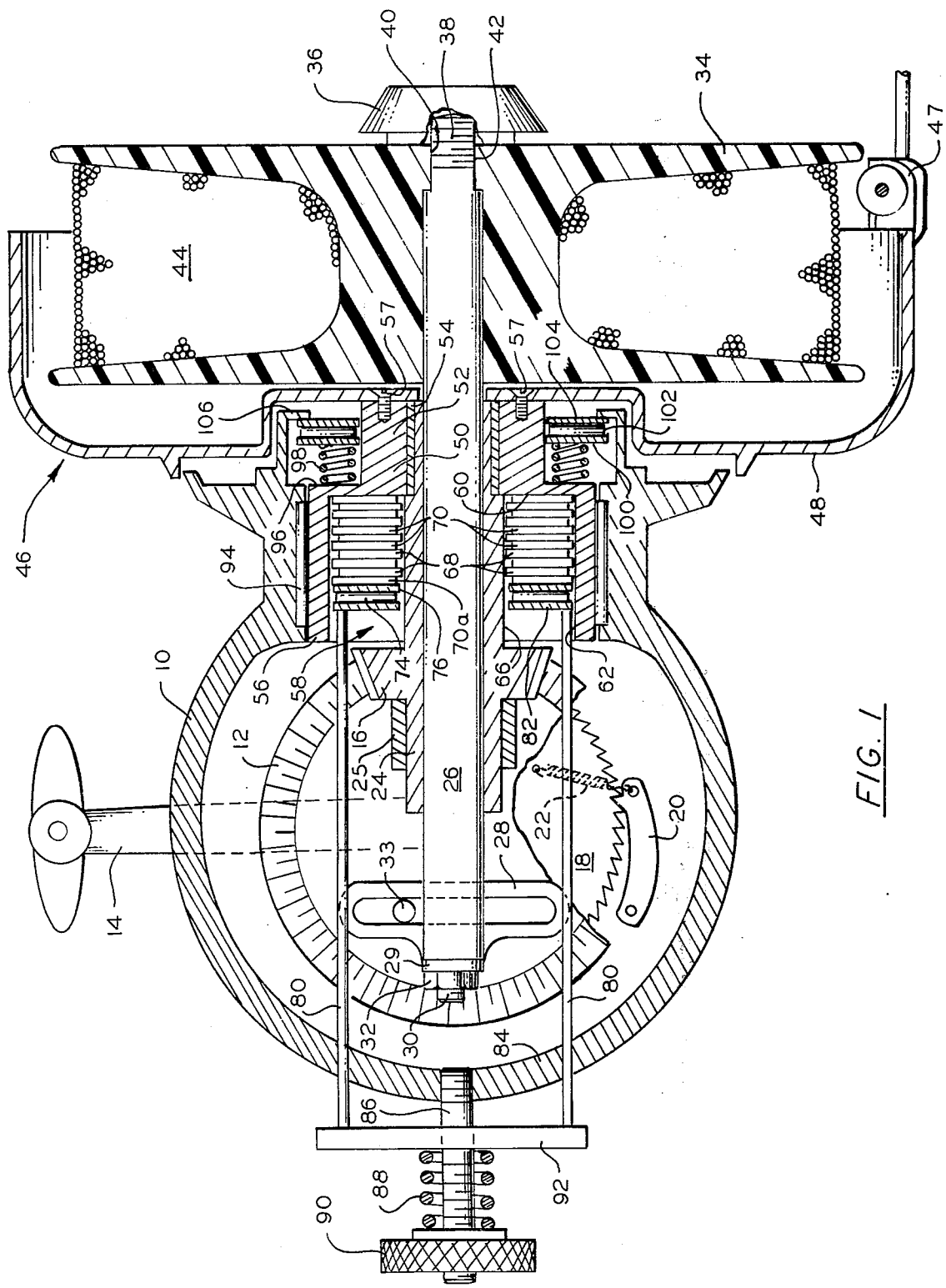
FIG. 1 is a vertical section through the fishing reel of the invention, with the bevel gear partially broken away for clarity.

FIG. 1 shows the improved drag means of this invention incorporated in a spinning type fishing reel. As in a conventional reel, a housing 10 contains driving means including a bevel gear 12 which, when rotated by a crank 14, operates to rotate a mating bevel gear 16 in a perpendicular plane. Anti-reverse means include a click wheel 18 fixed on the same axle (not shown) as bevel gear 12, the click wheel having a pawl 20 biased into engagement therewith by a click spring 22. A lever (not shown) operates conventionally to effect disengagement of the pawl from the click wheel. A driving member 24, having bevel gear 16 integral therwith, is rotatably supported by a boss 25 secured to the front side (not shown) of housing 10. The driving member 24 in turn supports an axle 26, the driving sleeve 24 being free to rotate relative to the axle. The axle is held from rotation by means including a cam 28 having a lug 29 extending perpendicular to the plane of FIG. 1, the lug having a bore through which a threaded portion 30 of the axle 26 passes. A nut 32 is screwed on the threaded portion of the axle 26 to secure the lug in position.

Conventionally, a cam follower 33 projecting from bevel gear 12 cooperates with cam 28 to effect a back and forth axial movement of axle 26 within the driving sleeve 24. A spool 34 is held on the other end of the axle by a wing nut 36 screwed on a threaded portion 38. The eye of the spool has a squared portion 40 to receive a mating squared portion 42 of the axle 26, and with the axle being non-rotational the spool is also non-rotational. A fishing line 44 is wound on the spool in the usual manner.

A line handling member 46, comprised of a bale 47 mounted on bale support housing 48, handles the line 44 during winding and unwinding. The line handling member 46 is operably connected to the driving sleeve 24 by drag inducing means. Any means capable of providing relative rotational resistance between the line handling member and the driving means may be employed to provide this drag. In the preferred embodiment the drag inducing means includes a driven sleeve 50 having a portion 52 slidably and rotatably mounted on a bushing 54, which encircles one part of the driving sleeve 24, and an enlarged portion 56 encircling another part of the driving sleeve. The bale support housing 48 is secured to the end of the driven sleeve portion 52 as by screws 57. A cavity 58, having as an end wall 60 a shoulder formed by the decreasing inner diameter of the driven sleeve, is created between the driving sleeve 24 and the enlarged portion 56 of the driven sleeve 50.

Clutch means are received in cavity 58 and include a plurality of annular friction members alternate ones of which are respectively coupled with the driving and driven sleeves 24,50. In this preferred embodiment, the inner diameter 62 of the driven sleeve 50 and the outer diameter 66 of the driving sleeve 24 are hexagonal in shape. Received in the cavity are friction discs 68 and 70 with discs 68 having hexagonal central apertures that conform with a sliding fit to the hexagonal driving sleeve 24. The peripheries of the alternate discs 70 are also hexagonal to conform with a sliding fit with the hexagonal interior of the driven sleeve 50. The outer diameters of discs 68 and inner diameters of discs 70 are circular and dimensioned so that discs 68 can rotate relative to the driven sleeve 50 while discs 70 can rotate relative to the driving sleeve.

A thrust bearing 74 is also received in cavity 58 with its inner race 76 adjacent the outermost friction disc 70a. Push rods 80 extend from the outer race 82 through the rear wall 84 of the gear housing 10. A bolt 86 fixed to the gear housing 10 has a compression spring 88 mounted thereon. A knurled knob 90, herein referred to as the drag adjustment knob, is screwed on the threaded portion of the bolt and engages one end of spring 88 while a plate 92, spanning the push rods 80, engages the other end of the spring. By rotating the drag adjustment knob 90 in the appropriate direction, spring 88 is compressed between the knob and plate 92, thereby forcing the push rods 80 to compress the friction discs 68, 70 between the end wall 60 of cavity 58 and bearing race 76. A reverse of this operation relieves the engagement pressure.

Although a multiplicity of friction discs 68,70 are shown in the preferred embodiment, any construction having at least one friction surface rotatable with the driving sleeve 24 and at least one friction surface rotatable with the driven sleeve 50 is workable. However, the more friction surfaces employed the less the axial force needed to obtain the required frictional resistance to the relative rotation of the concentric sleeves 24,50. Also, while the discs 68,70 are shown as being axially slidable within cavity 58, the discs may also be fixed to move axially with the sleeves.

The driven sleeve 50 rotates relative to gear housing 10 on needle roller bearing 94 and also slides axially within the gear housing on the needle bearing. Means to decrease the engagement bias between the friction discs 68,70 include a shoulder 96 created by the reduction in the outer diameter of the driven sleeve 50, the shoulder forming one support surface for a series of compression springs 98. The inner race 100 of a thrust bearing 102 is the other support surface for the springs. The outer race 104 of the bearing is held from forward axial movement by a lip 106 forming an extension of gear housing 10.

In normal operation, the drag means of the fishing reel are preset to induce a resistance to unwinding of a strength slightly less than the tensile strength of the line. To establish this resistance the anti-reverse means 18,20 are actuated to prevent reverse rotation of bevel gear 16, driving sleeve 24 and the friction discs 68 coupled with the driving sleeve 24. The drag adjustment knob 90 is then rotated in the appropriate direction until spring 88 no longer applies pressure on push rods 80 and thus no longer applies engagement pressure on the friction discs 68,70.

Figure 2:
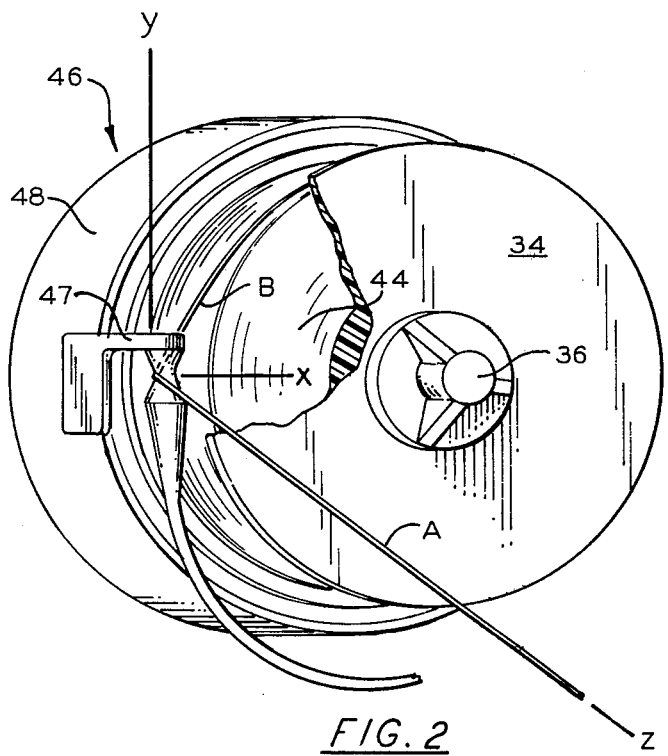
FIG. 2 is a perspective view of the line handling member and a spool full of windings, the spool being partially broken away to reveal the extent of the windings.

For illustrative purposes the line handling member 46 and the spool 34 are shown in FIG. 2 for an instant in time during which the line handling member may be considered non-rotating. As shown schematically in FIG. 2 a pull on that portion of the line 44 extending outwardly from the bale 47, and herein referred to as line segment A, acts through the bale on line segment B which is that portion of the line between the spool 34 and the bale. The pull of line segment B on the non-rotating spool 34 is opposed by an equal and opposite pull of the spool on line segment B. When the spool is full of line, the pull of line segment B on the line handling member 46 can be represented by vector $F'$ of FIG. 3. Vector $Y'$ represents that component of the pull on the line handling member tending to cause reverse rotation of the member. Vector $X'$ represents that component of the pull tending to pull the line handling member towards the spool 34. This $X'$ component must be opposed by sufficiently strong structural components. As seen in FIG. 1, pull on the line handling member 46 by line segment A acts through shoulder 96 of the driven sleeve 50 to compress springs 98 against race 100, thereby causing the driven sleeve to slide forward axially on the driving shaft 24.

Because of the forward movement of the driven sleeve 50 on the driving shaft 24, the friction discs 68,70 are not in tight frictional engagement with one another and the driven sleeve and line handling member 46 are free to rotate, thereby permitting line to be unwound from the spool 34.

Through the operation of the drag adjustment knob 90 as described hereinbefore, the friction discs 68 coupled with the driving sleeve 24 are forced into engagement with the friction discs 70 coupled with the driven sleeve 50. With the discs in engagement, a stronger pull on the line is required to overcome the resistance to the relative rotation of the driving and driven sleeves 24,50. By alternately operating the drag adjustment knob 90 and applying an increasingly stronger pull on line segment A (FIG. 2) a point is reduced where the pull on line segment A that is necessary to overcome the resistance of the engaged friction discs exceeds the line's tensile strength. When that point is reached the drag adjustment knob 90 is reversed slightly to a setting where the line drag is slightly less than the breaking point of the line.

As seen in FIG. 1, pressure applied by spring 88 to the push rods 80 is transmitted through the friction discs 68,70 and driven sleeve 50 to springs 98. Therefore, the total strength of springs 98 must be sufficiently greater than the strength of spring 88 to ensure that the engagement force applied to the friction discs isn't counteracted by a compression of springs 98.

With the drag means preset, the line 44 is cast in the conventional manner. When no fish has been hooked the line is rewound by manual rotation of crank 14 which acts through the bevel gears 12,16 and the operably connected driving and driven sleeves 24,50 to rotate the line handling member 46. The rotating line handling member 46 winds the line upon the non-rotating but back and forth oscillating spool 34.

Figure 3:
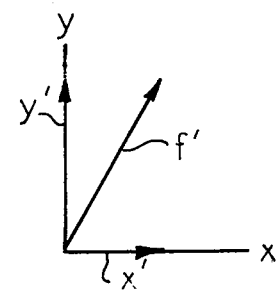
FIG. 3 is a schematic diagram of the forces affecting the line handling member during the unwinding of a full spool.

A fish hooked on the line and running with it exerts an unwinding pull on the line. As described previously, FIG. 2 shows the fishing reel with an unwinding pull on the line and FIG. 3 shows a schematic diagram of forces on the line handling member 46 resulting from this pull. The Y' component of force (FIG. 3) acts through the line handling member 46, FIG. 1, to become a rotating force on the friction discs 70 coupled with the driven sleeve 50. With the anti-reverse means 18,20 set, the friction discs 68 coupled with the driving sleeve 24 are held from rotation. Depending upon the relative strength of the rotational force to the strength of the frictional resistance to slippage there will be either slippage between the alternate discs 68,70 or frictional binding between them. With line drag being the resistance to the unwinding of line segment A, the line will unwind from the spool only when the pull on the line exceeds the line drag.

Figure 4:
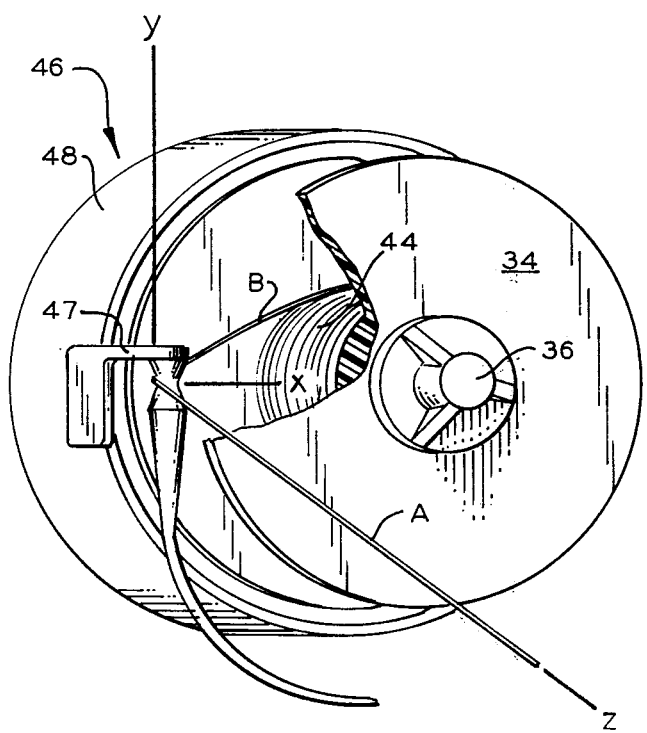
FIG. 4 is a perspective view of the line handling member and an almost empty spool, the spool being partially broken away to reveal the extent of the windings.
Figure 5:
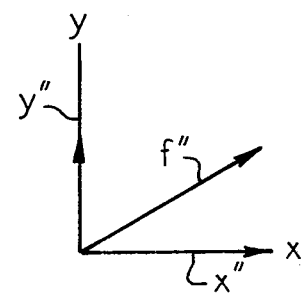
FIG. 5 is a schematic diagram of the forces affecting the line handling member during unwinding of a mostly empty spool.

A fish capable of overcoming this drag will be able to run with the line 44. However, as the line 44 is unwound the diameter of the windings on the spool 34 decreases and, as seen in FIG. 4, as the diameter of the windings decreases the angle that line segment B makes with the spool decreases. FIG. 5 shows schematically that the rotational component of force Y'' on the line handling member 46 decreases as the angle between the line segment and the spool decreases even though the line pull represented by F'' remains constant. Therefore, if all other factors remain the same, the pull on line segment A necessary to overcome the frictional resistance to slippage between the alternate discs 68 must be increased. Thus, as the line continues to be unwound the line drag will increase to a value in excess of the tensile strength of the line.

While the fishing reel of this invention has drag inducing means whose line drag is dependent on the varying diameter of the windings on the spool, this dependency is not as great as that of a conventional reel. A typical conventional reel has approximately a 300 percent increase in drag while the reel of this invention has approximately a 200 percent increase in drag for the same decrease in the diameter of the windings.

The second major advantage of the fishing reel disclosed herein is that when a fish is being played and the line is alternately wound on and unwound from the spool there is no cumulative line twisting. Being twisted each time it is wound on the spool, unless there is untwisting each time it is unwound, the line in a conventional reel will twist into what is called a bird's nest at the slightest relaxation of tension on the line. In a conventional fishing reel the spool rotates causing the line to be unwound without being untwisted. In the fishing reel of this invention, with the line being unwound by the same means (line handling member 46) that winds the line on the spool, there is an untwisting during unwinding that compensates for the twisting during winding.

A further advantage of the invention is that it facilitates the use of additional means to compensate for the decreasing rotational force on the line handling member as the line is run out. This additional means will ensure that the line drag will remain relatively constant no matter how much line has been taken by a running fish. The operation of the additional means employed in the preferred embodiment are as follows: As the line drag increases due to a decrease in the windings on the spool 34, the pull on line segment A will either remain constant, which will result in the line no longer being unwound, or the pull along the line will increase. As seen in FIG. 1, pull on line segment A is transmitted to the bale support housing 48 through bale 47. From the housing the pull is transmitted through driven sleeve 50 to shoulder 96 which compresses springs 98 against bearing race 100. As the pull increases, the compressive force of shoulder 96 increases. As the springs are compressed, driven sleeve 50 and thus cavity end wall 60 move towards the line handling member to thereby relieve some of the engagement force on the friction discs 68,70.

Now as the pull on the line increases the frictional resistance to relative rotation of the sleeves 24,50 decreases. Therefore as the diameter of the line windings decreases and thus the rotational force on the line handling member decreases, the rotational force needed to overcome the frictional resistance of the alternate friction discs to relative rotation also decreases. With proper engineering, taking into consideration the strength of spring 88 and the variation in the angle made by ine segment B with the spool, springs 98 can be designed so that the resistance to relative rotation of the alternate discs 68,70 decreases in proportion to the decrease in rotational force on the line handling member 46 caused by the decrease in windings on the spool.

As will be apparent to those familiar with the art, the invention may be embodied in other specific forms without departing from the spirit or essential characteristics thereof.

I claim:

1. An improvement for fishing reels of both the spinning and spin cast type including:

driving means;

a driving member rotated by the driving means;

a non-rotatable spool for holding a fishing line;

a rotatable line handling member for controlling the line during winding and unwinding on the spool;

a driven sleeve operably connected to the line handling member, a portion of said sleeve encircling the driving member in spaced relation thereto whereby a cavity is formed between the sleeve and member;

friction elements received within the cavity, the elements being operably connected to rotate with either the driven sleeve or the driving member;

means including cooperating threaded members to bias the friction elements into engagement with one another, said means being adjustable to create varying biasing forces whereby the amount of the resistance to relative rotation between the driving member and the driven sleeve can be preset to allow slippage between the friction surfaces at a predetermined level of relative rotational force on the members; and compensating means to decrease the engagement bias between the friction elements when the induced drag increases on the line as the latter is unwound from the spool.

2. The improvement for fishing reels of claim 1 wherein the compensating means includes;
spring means opposing disengagement of the friction elements which rotate with the driven sleeve from the friction elements which rotate with the driving member, said spring means being positioned between a portion of the driven sleeve and a portion of the housing so as to be compressed by axial pull on the line handling member resulting from pull on the line.

* * * * *